(12) United States Patent
He et al.

(10) Patent No.: US 11,251,720 B1
(45) Date of Patent: Feb. 15, 2022

(54) METHOD AND APPARATUS FOR CONTROLLING GRID-TIE INVERTER

(71) Applicant: Jiangsu Contemporary Amperex Technology Limited, Changzhou (CN)

(72) Inventors: Weichen He, Changzhou (CN); Zhimin Dan, Changzhou (CN); Jinfeng Gao, Changzhou (CN); Yizhen Hou, Changzhou (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 0 days.

(21) Appl. No.: 17/485,554

(22) Filed: Sep. 27, 2021

Related U.S. Application Data

(63) Continuation of application No. PCT/CN2021/075979, filed on Feb. 8, 2021.

(30) Foreign Application Priority Data

Nov. 17, 2020 (CN) .......................... 202011284302.8

(51) Int. Cl.
*H02M 7/538* (2007.01)
*H02M 7/5387* (2007.01)
(Continued)

(52) U.S. Cl.
CPC .......... *H02M 7/5387* (2013.01); *H02J 3/322* (2020.01); *H02J 3/38* (2013.01); *H02M 7/48* (2013.01); *B60L 55/00* (2019.02)

(58) Field of Classification Search
CPC ...... H02M 7/5387; H02M 7/48; H02M 7/493; H02J 3/38; B60L 55/00; G05B 13/04
See application file for complete search history.

(56) References Cited

U.S. PATENT DOCUMENTS 9,071,141 B2 * 6/2015 Dong .................. H02M 3/1582
9,698,665 B2 * 7/2017 Khajehoddin .......... H02M 1/00
(Continued)

FOREIGN PATENT DOCUMENTS

CN 101710797 A 5/2010
CN 201947196 U 8/2011
(Continued)

OTHER PUBLICATIONS

The International search report for PCT Application No. PCT/CN2021/075979, dated Aug. 5, 2021, 12 pages.
(Continued)

*Primary Examiner* — Yusef A Ahmed
(74) *Attorney, Agent, or Firm* — Law Offices of Liaoteng Wang

(57) ABSTRACT

This application provides a method and an apparatus for controlling a grid-tie inverter. The method includes: acquiring an output voltage of the grid-tie inverter and an output current value of the grid-tie inverter at a current moment; calculating N output current values of the grid-tie inverter at a next moment that is in one-to-one correspondence to N switch states of the grid-tie inverter based on the output current value at the current moment, and N is a natural number greater than or equal to 2; acquiring a first reference current based on the output voltage; acquiring a second reference current based on the output current and the first reference current; determining a first switch state; and controlling the grid-tie inverter to perform power transmission in the first switch state at the next moment.

9 Claims, 13 Drawing Sheets

(51) Int. Cl.
*H02J 3/32* (2006.01)
*H02J 3/38* (2006.01)
*H02M 7/48* (2007.01)
*B60L 55/00* (2019.01)

(56) References Cited

U.S. PATENT DOCUMENTS

| | | | | |
|---|---|---|---|---|
| 10,530,267 | B1* | 1/2020 | Wu | H02M 3/3376 |
| 10,971,937 | B2* | 4/2021 | Khajehoddin | H02M 1/42 |
| 2006/0245221 | A1* | 11/2006 | Ohshima | H02M 7/53871 |
| | | | | 363/131 |
| 2009/0224720 | A1* | 9/2009 | Oyobe | H02M 1/12 |
| | | | | 318/801 |
| 2010/0164418 | A1* | 7/2010 | Higuchi | H02J 1/102 |
| | | | | 318/400.26 |
| 2011/0026281 | A1* | 2/2011 | Chapman | H02M 1/15 |
| | | | | 363/65 |
| 2011/0130889 | A1* | 6/2011 | Khajehoddin | H02J 3/01 |
| | | | | 700/298 |
| 2012/0057383 | A1* | 3/2012 | Wei | H02M 7/53871 |
| | | | | 363/98 |
| 2012/0212064 | A1* | 8/2012 | Spanoche | H02M 7/48 |
| | | | | 307/82 |
| 2012/0229063 | A1* | 9/2012 | Yokokawa | H02P 9/48 |
| | | | | 318/400.07 |
| 2012/0257429 | A1* | 10/2012 | Dong | H02M 3/1582 |
| | | | | 363/127 |
| 2014/0078780 | A1* | 3/2014 | Khajehoddin | H02M 7/48 |
| | | | | 363/13 |
| 2015/0180384 | A1* | 6/2015 | An | F25B 1/005 |
| | | | | 62/498 |
| 2015/0326144 | A1* | 11/2015 | Pahlevaninezhad | |
| | | | | H02M 7/5387 |
| | | | | 363/97 |
| 2016/0373025 | A1* | 12/2016 | Mascioli | H02J 3/383 |
| 2017/0025943 | A1* | 1/2017 | Eren | H02M 7/53873 |
| 2017/0294863 | A1* | 10/2017 | Takahashi | H02P 21/22 |
| 2018/0241340 | A1* | 8/2018 | Hoshino | H02P 29/662 |
| 2019/0052097 | A1 | 2/2019 | Shin et al. | |
| 2019/0058418 | A1* | 2/2019 | Mori | H02H 7/1225 |
| 2019/0322309 | A1* | 10/2019 | Takase | H02P 27/00 |
| 2021/0143752 | A1* | 5/2021 | Zhang | H02M 7/521 |
| 2021/0305890 | A1* | 9/2021 | Karimi | H02M 7/539 |

FOREIGN PATENT DOCUMENTS

| | | |
|---|---|---|
| CN | 104393620 A | 3/2015 |
| CN | 105515430 A | 4/2016 |
| CN | 108429286 A | 8/2018 |
| CN | 109787495 A | 5/2019 |
| CN | 110045610 A | 7/2019 |
| CN | 110138253 A | 8/2019 |
| CN | 112018809 A | 12/2020 |
| CN | 112104244 A | 12/2020 |

OTHER PUBLICATIONS

The First Office Action for Chinese Application No. 202011284302. 8, dated Dec. 24, 2020, 9 pages.

The Second Office Action for Chinese Application No. 202011284302. 8, dated Jan. 7, 2021, 7 pages.

The Notice of Allowance and supplementary search report for Chinese Application No. 202011284302.8, dated Jan. 13, 2021, 4 pages.

Leilei Guo et al., "Sliding mode observer based AC voltage sensorless model predictive control for grid-connected inverter", Electric Power Automation Equipment, vol. 40, No. 6, dated Jun. 2, 2020, 7 pages.

* cited by examiner

METHOD AND APPARATUS FOR CONTROLLING GRID-TIE INVERTER

CROSS-REFERENCE TO RELATED APPLICATIONS

This application is a continuation of International Application No. PCT/CN2021/075979, filed on Feb. 8, 2021, which claims priority to Chinese Patent Application No. 202011284302.8, filed on Nov. 17, 2020, both of which are hereby incorporated by reference in their entireties.

TECHNICAL FIELD

This application relates to the field of electric power technology, and in particular to a method and an apparatus for controlling a grid-tie inverter and an apparatus.

BACKGROUND

In recent years, as the key equipment for grid-tie operation of new energy power generation systems such as wind power and photovoltaics, grid-tie inverters have been widely used. How to optimize the control strategy of grid-tie inverters and improve the operational reliability of grid-tie inverters has become a current research hotspot.

With the increase in the computing speed of digital signal processors, some new intelligent control methods have emerged, such as fuzzy control, adaptive control, sliding mode control, model predictive control, etc. Model predictive control has become the main research direction in the field of predictive control of grid-tie inverters because of its advantages such as fast dynamic response.

However, disturbances will inevitably occur online, resulting in low power transmission efficiency.

SUMMARY

The present application provides a control method for a grid-tie inverter and an apparatus, which improves the power transmission efficiency of the system.

According to a first aspect of the present application, a control method for a grid-tie inverter is provided, which includes: acquiring an output voltage of the grid-tie inverter and an output current value of the grid-tie inverter at a current moment; calculating N output current values of the grid-tie inverter at a next moment based on the output current value at the current moment, where the N output current values at the next moment are in one-to-one correspondence to N switch states of the grid-tie inverter, and N is greater than or equal to 2; acquiring a first reference current based on the output voltage; acquiring a second reference current based on the output current of the grid-tie inverter and the first reference current; determining a first switch state from the N switch states, where a difference value between the output current value at the next moment corresponding to the first switch state and a value of the second reference current at the next moment is a minimum value among difference values between the N output current values at the next moment and the value of the second reference current at the next moment; and controlling the grid-tie inverter to perform power transmission in the first switch state at the next moment.

According to a second aspect of the present application, a control apparatus for a grid-tie inverter is provided, which includes an acquiring unit and a processing unit. The acquiring unit is configured to acquire an output voltage of the grid-tie inverter and an output current value of the grid-tie inverter at a current moment. The processing unit is configured to calculate N output current values of the grid-tie inverter at a next moment based on the output current value at the current moment, where the N output current values at the next moment are in one-to-one correspondence to N switch states of the grid-tie inverter, and N is greater than or equal to 2, to acquire a first reference current based on the output voltage, and acquire a second reference current based on the output current of the grid-tie inverter and the first reference current, to determine a first switch state from the N switch states, where a difference value between the output current value at the next moment corresponding to the first switch state and a value of the second reference current at the next moment is a minimum value among difference values between the N output current values at the next moment and the value of the second reference current at the next moment, and to control the grid-tie inverter to perform power transmission in the first switch state at the next moment.

The above second reference current used to determine the first switch state is a current on the basis of the original first reference current with the output current of the grid-tie inverter being considered, which means the output with disturbance is fed back to the control system. Therefore, the obtained second reference current includes the reference current that compensates for the disturbance. With the first switch state determined in this manner, the output current of the grid-tie inverter can be undoubtedly controlled more accurately, thereby greatly improving the robustness of the entire control system.

Optionally, the above-described processing unit may be configured to: establish a third-order state model based on an output current of the grid-tie inverter; and acquire the second reference current based on the established third-order state model and the first reference current, where the second reference current includes a compensation value for a system disturbance.

The third-order state model is:

$$\begin{cases} X_1 = i_g \\ X_2 = \dot{X}_1 = \dfrac{di_g}{dt} \\ X_3 = \dot{X}_2 \end{cases},$$

where $X_1$ represents the output current $i_g$ of the grid-tie inverter, $X_2$ is a differential of $X_1$, and $X_3$ is a differential of $X_2$ and represents the system disturbance, the second reference current is obtained by the following equation:

$$u = \frac{k_p(i_{ref1} - X_1) - k_d X_2 - X_3}{b_0},$$

where u represents the second reference current, $i_{ref1}$ is the first reference current, $k_p = w_c^2$, $k_d = 2w_c$, $w_c$ is a cut-off frequency of the grid-tie inverter, $$b_0 = \frac{1}{LC},$$

L is an inductance of the grid-tie inverter, and C is a capacitance in the grid-tie inverter.

Optionally, the above-described processing unit may be configured to: obtain N switch output voltages respectively, based on the N switch states and an input voltage of the grid-tie inverter; and obtain the N output current values at the next moment, based on the output current value at the current moment, values of the N switch output voltages at the current moment and a value of the output voltage of the grid-tie inverter at the current moment.

The N output current values at the next moment $i_g(k+1)$ is calculated based on the following equation:

$$i_g(k+1) = \left(1 - \frac{T_s}{L}r\right) \times i_g(k) + \frac{T_s}{L}(U_0(k) - V_g(k)),$$

where k represents the current moment, $T_s$ is a control frequency of the grid-tie inverter, r is an internal resistance of the grid-tie inverter, L is an inductance of the grid-tie inverter, $i_g(k)$ are the N output current values at the current moment, $U_0(k)$ are the values of the N switch output voltages at the current moment, and $V_g(k)$ are the value of the output voltage of the grid-tie inverter at the current moment.

Optionally, the processing unit is configured to: obtain a grid phase of the grid-tie inverter based on the output voltage; and acquire the first reference current based on the grid phase.

According to a third aspect of the present application, a grid-tie inverter system is provided, which includes a grid-tie inverter and the above-described control apparatus.

The grid-tie inverter system uses the above-mentioned control apparatus to control the grid-tie inverter. Therefore, the current actually outputted by the grid-tie inverter can be closer to the expected output current.

According to a fourth aspect of the present application, a vehicle-to-grid (Vehicle-to-Grid, V2G) system is provided, which includes the grid-tie inverter system as described above.

The V2G system adopts the grid-tie inverter system as described above, and therefore, it can more stably transmit the surplus power of the electric vehicle to the public grid.

According to a fifth aspect of the present application, a computer-readable storage medium is provided, the computer-readable storage medium has instructions stored thereon, where the instructions, when executed by a processor, may implement the above-described control method for the grid-tie inverter.

The features of the above aspects of the present application will become clearer through the following detailed description in combination with the attached drawings.

BRIEF DESCRIPTION OF THE DRAWINGS

For clearer illustration of the technical solutions of embodiments of the present application, the drawings to be used in the embodiments of the present application will be briefly introduced. Apparently, the drawings described below are only some embodiments of the application. Other drawings can be obtained by those who ordinarily skilled in the art on the basis of the drawings without any creative work.

DETAILED DESCRIPTION

Specific embodiments of the present application will be described below. In this application, unless particularly specified, all the embodiments and preferred embodiments described herein can be combined with each other to form new technical solutions, and all the technical features and preferred features described herein can be combined with each other to form new technical solutions.

In addition, unless particularly specified, the terms "include" and "include" used herein may be intended to cover a non-exclusive inclusion or an exclusive inclusion. For example, the "include" and "include" may intend to cover other elements, steps or components that are not listed, or to cover only elements, steps or components are listed. In the description, unless otherwise specified, "a certain number or more" and "a certain number or less" are intended to cover the number, and the term "more" in the phrase "one or more" means two or more.

According to an embodiment of the present application, a control method for a grid-tie inverter is provided.

Figure 1:
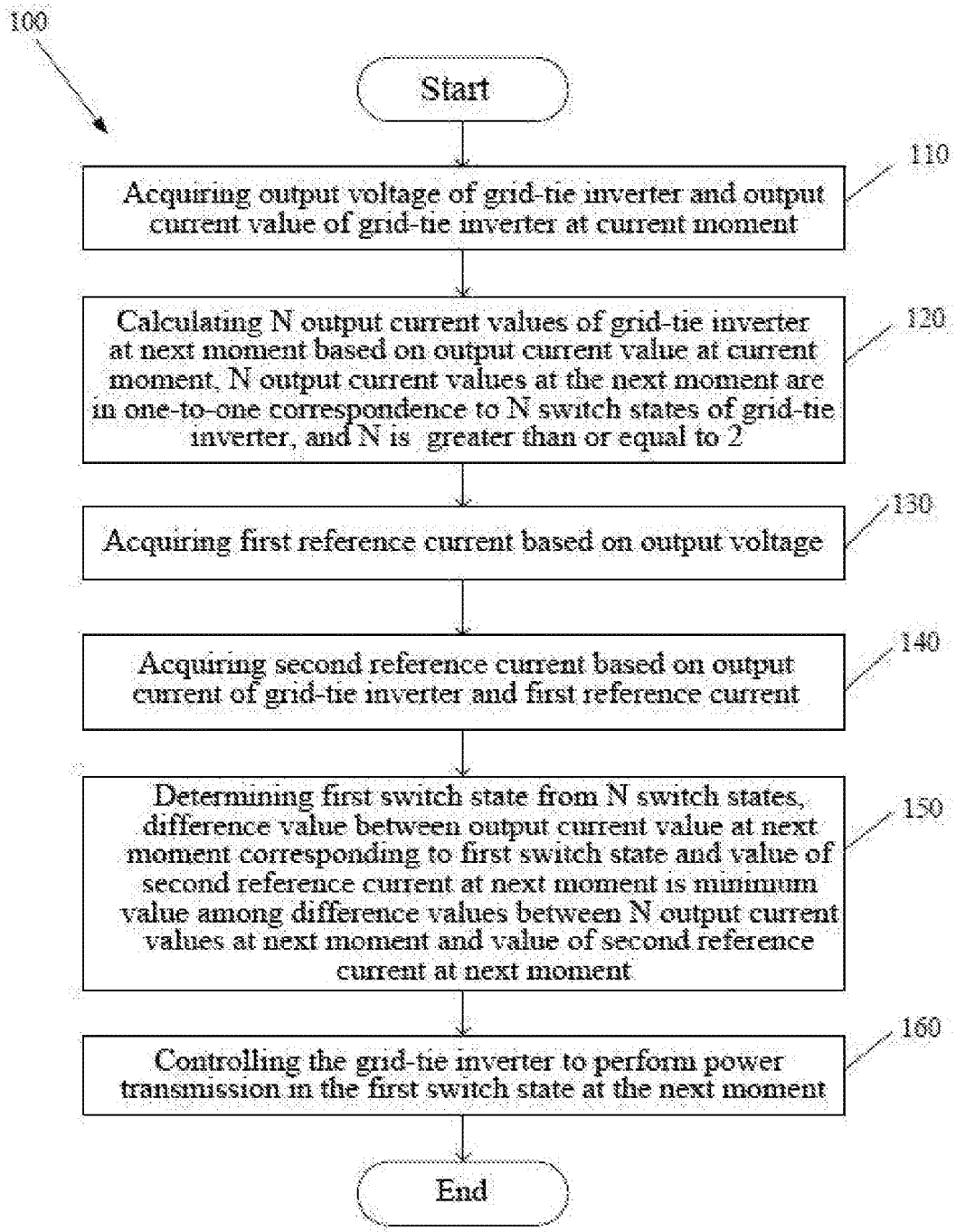
FIG. 1 is a flowchart of a control method for a grid-tie inverter according to the present application.

Referring to FIG. 1, a control method 100 for a grid-tie inverter according to the present application is illustrated. The control method 100 may include steps 110 to 160.

As shown in FIG. 1, at step 110, an output voltage of the grid-tie inverter and an output current value of the grid-tie inverter at the current moment are acquired. An output of the grid-tie inverter is a three-phase alternating current. The output voltage is represented by a function of $V_g$. The output current is represented by a function of $i_g$. The output current value at the current moment is $i_g(k)$, where k represents the current moment.

At step 120, N output current values of the grid-tie inverter at a next moment is calculated based on the output current value at the current moment, where the N output current values at the next moment are in one-to-one correspondence to N switch states of the grid-tie inverter, and N is a natural number greater than or equal to 2.

At step 130, a first reference current is acquired based on the output voltage. The first reference current is a current expected to be outputted by the grid-tie inverter. Therefore, similarly to the output current, the first reference current is a three-phase alternating current, which is represented by a function of i_ref1.

At step 140, a second reference current is acquired based on the output current of the grid-tie inverter and the first reference current. The second reference current is represented by a function of i_ref2. The second reference current is actually a current with a compensation added on the basis of the first reference current i_ref1, because the obtaining of the second reference current is further based on the output current of the grid-tie inverter, which means errors and disturbances of the system are fed back to the input end and the obtained final reference current includes a compensation that can cancel the errors and disturbances.

At step 150, a first switch state is determined from the N switch states, where a difference value between an output current value at the next moment corresponding to the first switch state and a value of the second reference current at the next moment is a minimum value among difference values between the N output current values at the next moment and the value of the second reference current at the next moment.

At step 160, the grid-tie inverter is controlled to perform power transmission in the first switch state at the next moment.

According to the control method, in the prediction of the output current value at the next moment, a value of the second reference current with the compensation at the next moment is used, so that the obtained output current value at the next moment is more accurate. Through the above-described control method, each output current value at the next moment is predicted, and the switches of the grid-tie inverter are set based on the switch state corresponding to the predicted output current values at the next moment. In this manner, the output stability of the grid-tie inverter can be improved.

The control method 100 according to the present application will be further described below in conjunction with a working principle diagram and a schematic diagram of a topological structure of the grid-tie inverter.

Figure 2:
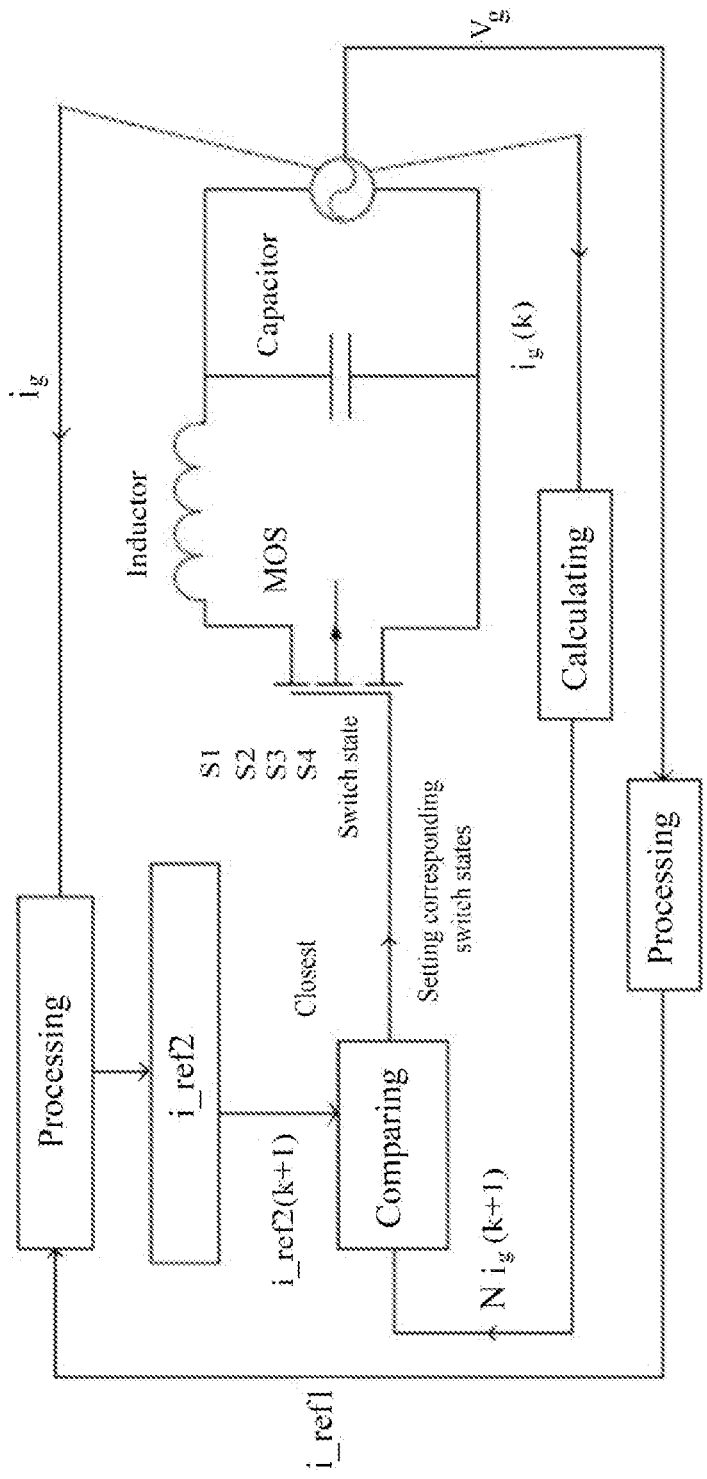
FIG. 2 is a working principle diagram exemplarily illustrating the control method for the grid-tie inverter according to the present application.

As shown in the working principle diagram of the grid-tie inverter in FIG. 2, the output of the grid-tie inverter is a three-phase alternating current. The output voltage is a voltage across the capacitor in FIG. 2, which can be obtained by a sensor and represented by a function of $V_g$. The output current is the branch $i_g$ in FIG. 2, that is, a difference value between a grid-tie current flowing through the inductor in FIG. 2 and a current flowing through the capacitor in FIG. 2, which may be obtained by a sensor and represented by a function of $i_g$. The output current value at the current moment is $i_g(k)$, where k represents the current moment. At step 110, the output voltage $V_g$ of the grid-tie inverter and the output current value $i_g(k)$ at the current moment are acquired through the sensor.

At step 120, N output current values $i_g(k+1)$ of the grid-tie inverter at the next moment are calculated based on the acquired output current value $i_g(k)$ at the current moment. The N output current values $i_g(k+1)$ at the next moment is in one-to-one correspondence with the N switch states of the grid-tie inverter. A topological structure of an embodiment shown in FIG. 3 is taken as an example for illustrating how to obtain the N output current values $i_g(k+1)$ at the next moment.

Figure 3:
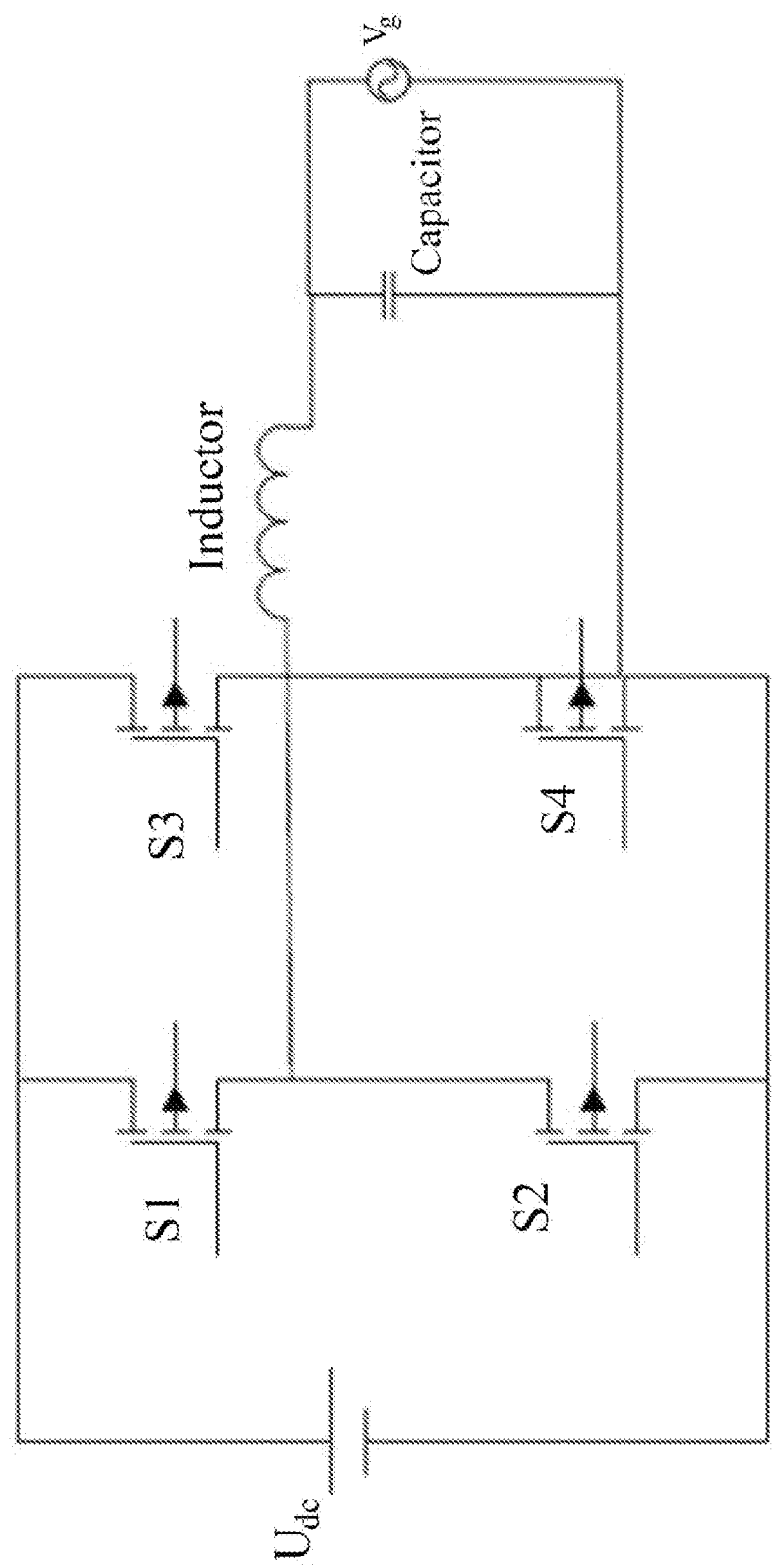
FIG. 3 is a schematic diagram of a topological structure of an embodiment of the grid-tie inverter according to the present application.

FIG. 3 exemplarily illustrates a schematic diagram of a topological structure of an embodiment of the grid-tie inverter according to the present application. The grid-tie inverter is a single-phase grid-tie inverter including four switches S1, S2, S3, and S4, which may be, for example, MOS transistors. It should be particularly noted that, the grid-tie inverter according to the present application is not limited to the above-mentioned form, and accordingly, the switch combination is not limited to the above-mentioned S1, S2, S3, and S4. For example, the grid-tie inverter according to the present application may also be a three-phase grid-tie inverter including six switches.

For the grid-tie inverter shown in FIG. 3, each of the four switches S1, S2, S3, and S4 is in an ON state (denoted as "1") or an OFF state (denoted as "0"). Through permutation and combination of these states, the following four switch states of the grid-tie inverter may be obtained. In each of the switch states, the output current value $i_g(k+1)$ at the next moment calculated based on the output current value $i_g(k)$ at the current moment is different from that in each of the other switch states.

TABLE 1

| | Switch state | | | |
|---|---|---|---|---|
| Number | S1 | S2 | S3 | S4 |
| Switch state 1 | 1 | 0 | 0 | 1 |
| Switch state 2 | 1 | 0 | 1 | 0 |
| Switch state 3 | 0 | 1 | 1 | 0 |
| Switch state 4 | 0 | 1 | 0 | 1 |

Figure 4:
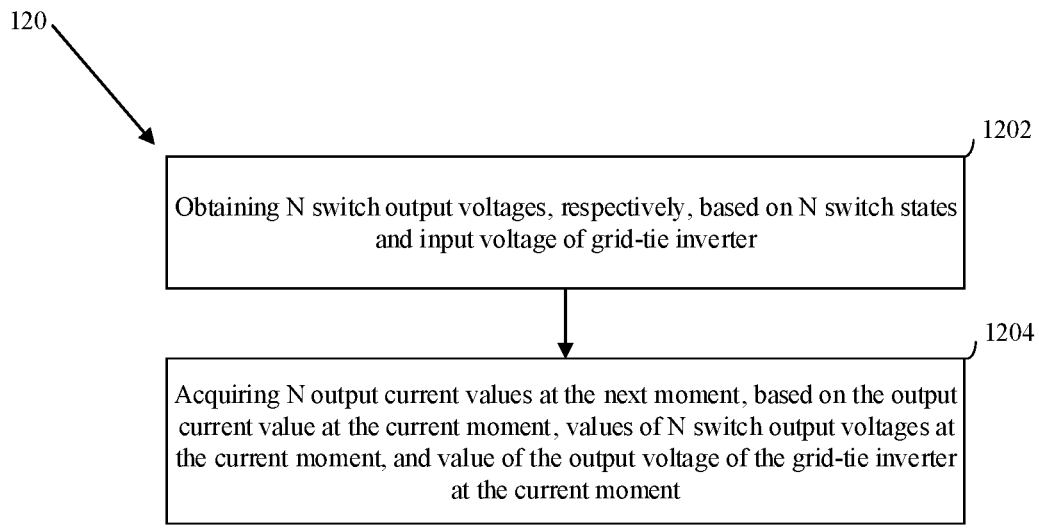
FIG. 4 is a flowchart of an embodiment of a control method for a grid-tie inverter according to the present application.

Optionally, the step 120 may include sub-step 1202 and sub-step 1204 as shown in FIG. 4.

In sub-step 1202, N switch output voltages are obtained, respectively, based on the N switch states and an input voltage of the grid-tie inverter.

Referring to FIG. 3, for the topological structure of the grid-tie inverter shown in FIG. 3, the relationship between the switch states, the input voltage of the grid-tie inverter and the switch output voltages is as follows:

$$U_0 = (S1 \times S3 - S2 \times S4) \times U_{dc} \qquad (1),$$

where $U_{dc}$ is a voltage across the battery, that is, a direct current input voltage of the grid-tie inverter. $U_0$ is a switch output voltage outputted after a switch combination. S1, S2, S3, and S4 are the ON/OFF states of the respective switches ("ON" is recorded as "1", and "OFF" is recorded as "0"). The relationship shown in Table 2 may be obtained thereby.

TABLE 2

| Number | S1 | S2 | S3 | S4 | U0 |
|---|---|---|---|---|---|
| Switch state 1 | 1 | 0 | 0 | 1 | $U_{dc}$ |
| Switch state 2 | 1 | 0 | 1 | 0 | 0 |
| Switch state 3 | 0 | 1 | 1 | 0 | $-U_{dc}$ |
| Switch state 4 | 0 | 1 | 0 | 1 | 0 |

It can be understood that, the relationship in Table 2 is based on the topological structure shown in FIG. 3. When another topological structure is adopted by the grid-tie inverter, the relationship between the switch states and the switch output voltages will be different.

At sub-step 1204, the N output current values $i_g(k+1)$ at the next moment are acquired, based on the output current value at the current moment $i_g(k)$, values $U_0(k)$ of the N switch output voltages at the current moment, and a value $V_g(k)$ of the output voltage $V_g$ of the grid-tie inverter at the current moment.

Optionally, Equation (2) may be obtained according to Kirchhoff's voltage law, which is as following:

$$U_0(k) - V_g(k) = L\frac{di}{dt} + i_g(k) \times r, \quad (2)$$

where L is an inductance in the grid-tie inverter, i is the output current at the current moment, r is an internal resistance of the grid-tie inverter, and d is a differential function.

Then Equation (3) obtained according to Euler's formula is submitted into above Equation (2) given above, so that the output current value $i_g(k+1)$ of the grid-tie inverter at the next moment may be obtained, where $T_s$ is a control frequency of the grid-tie inverter. The Equation (3) is as following:

$$\frac{di}{dt} = \frac{i_g(k+1) - i_g(k)}{T_s}. \quad (3)$$

$$i_g(k+1) = \left(1 - \frac{T_s}{L}r\right) \times i_g(k) + \frac{T_s}{L}(U_0(k) - V_g(k)). \quad (4)$$

The N output current values $i_g(k+1)$ at the next moment may be calculated according to Equation (4) given above. Specifically, for the topological structure shown in FIG. 3, values ($U_{dc}$, 0, $-U_{dc}$, and 0) of U0 corresponding to the switch states 1 to 4 listed in Table 2 at the current moment are substituted into Equation (4) to obtain four output current values at the next moment: $i_g(k+1)\_1$, $i_g(k+1)\_2$, $i_g(k+1)\_3$ and $i_g(k+1)\_4$.

While the N output current values $i_g(k+1)$ of the grid-tie inverter at the next moment are calculated, as shown in FIG. 2, the first reference current i_ref1 is also acquired based on the output voltage $V_g$, which corresponds to step 130 in the control method 100. The grid phase of the grid-tie inverter is also to be considered in the obtaining of the first reference current i_ref1. Thus, the output voltage $V_g$ is to be used.

Figure 5:
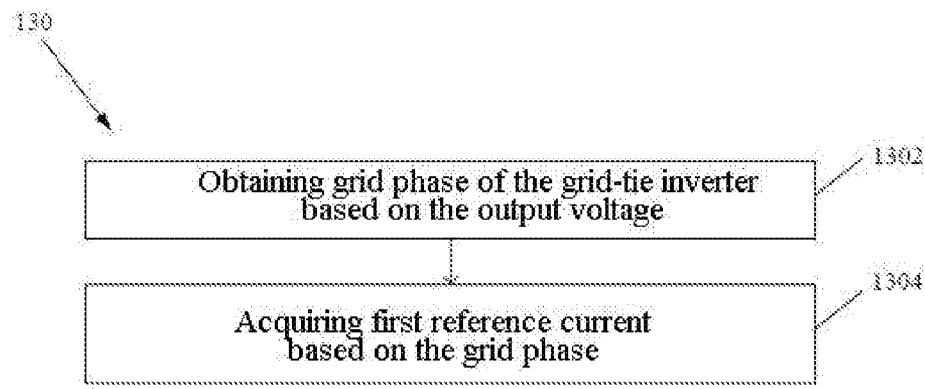
FIG. 5 is a flowchart of another embodiment of a control method for a grid-tie inverter according to the present application.

Optionally, the step 130 may include sub-step 1302 and sub-step 1304 as shown in FIG. 5.

Figure 7:
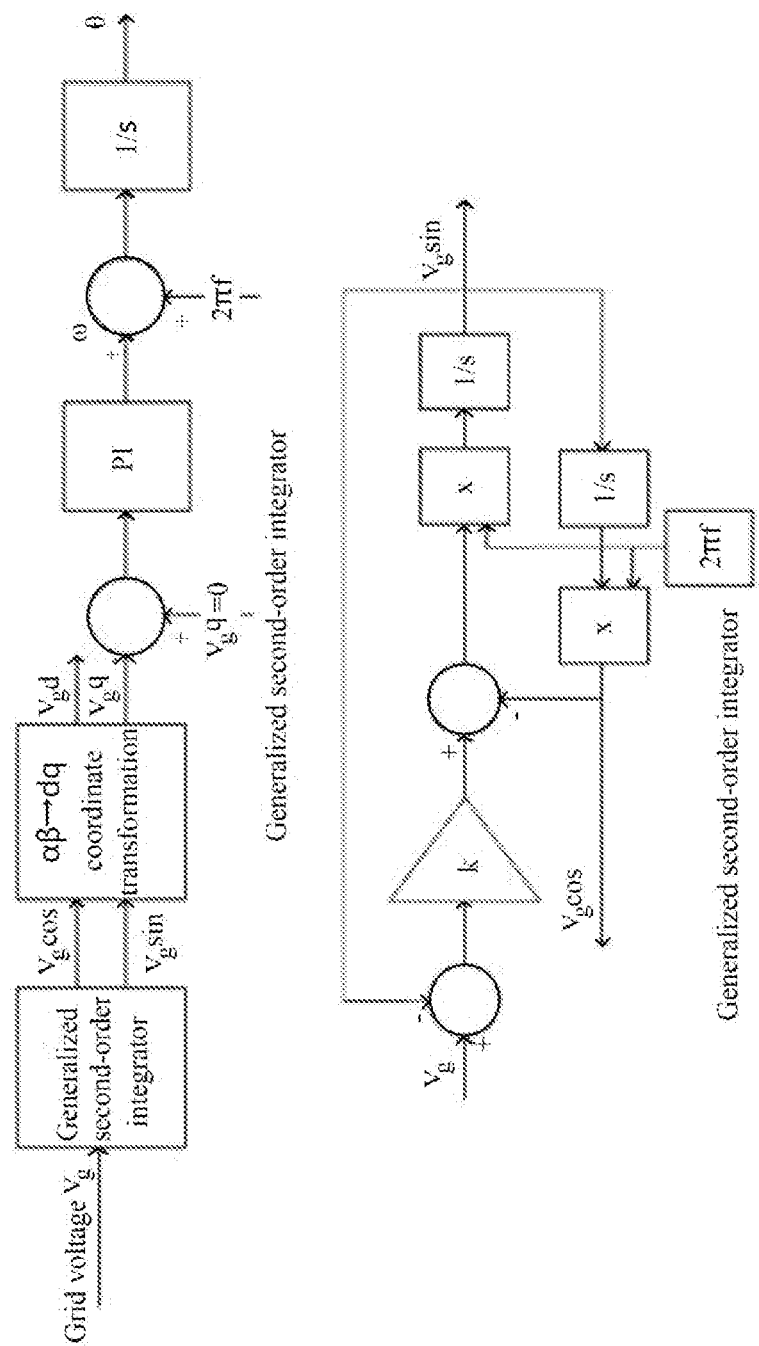
FIG. 7 is a schematic diagram illustrating a method for obtaining a grid phase based on an output voltage of the grid-tie inverter.

At sub-step 1302, the grid phase of the grid-tie inverter is obtained based on the output voltage $V_g$. For example, the obtaining can be realized by a phase-locked loop. Optionally, for the single-phase grid-tie inverter shown in FIG. 3, since the outputted grid-tie voltage has only one voltage component, a phase-locked loop based on a generalized second-order integrator is needed. FIG. 7 shows the phase-locked loop and the generalized second-order integrator. A single-phase voltage component $V_g$ passes through the generalized second-order integrator, and two orthogonal voltage phasors $V_{g\_sin}$ and $V_{g\_cos}$ are generated. The voltage phasors are converted to a dq axis through dq left-side transformation. A q-axis reactive component becomes 0 through a pi controller, phase locking is achieved, and an output θ is the grid phase.

At sub-step 1304, the first reference current is acquired based on the grid phase. Specifically, by multiplying the obtained grid phase θ with the expected output current value $i_{expected}$ of the grid-tie inverter, the first reference current may be obtained as $i\_ref1 = i_{expected} * \sin θ$. The expected output current value $i_{expected}$ may be a value in the range of 0 to 30 A, for example.

After the first reference current is obtained, as shown in FIG. 2, the second reference current i_ref2 is acquired based on the output current $i_g$ of the grid-tie inverter and the first reference current i_ref1, which corresponds to step 140 in the control method 100.

Figure 6:
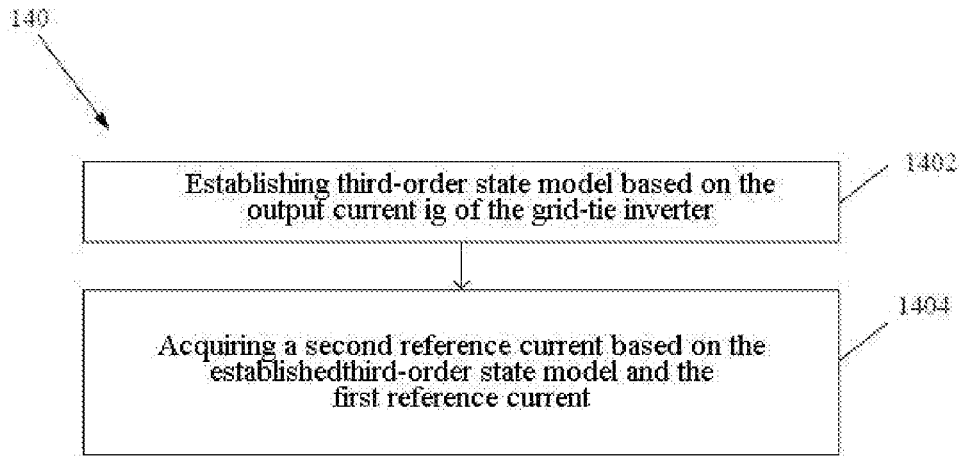
FIG. 6 is a flowchart of another embodiment of a control method for a grid-tie inverter according to the present application.

Optionally, the step 140 may include sub-step 1402 and sub-step 1404 as shown in FIG. 6.

At sub-step 1402, a third-order state model is established based on the output current $i_g$ of the grid-tie inverter. The LC filter included in the grid-tie inverter shown in FIG. 2 is a second-order system. The third-order state model is established on the basis of the second-order LC system. The expanded system model is the disturbance of the system. That is, the estimated system disturbance is obtained.

At sub-step 1404, a second reference current is obtained based on the established third-order state model and the first reference current. That is, the obtained disturbance output is compensated to the first reference current, and the second reference current obtained thereby includes the compensation value for the system disturbance. Feeding the compensated reference current (that is, the second reference current) to the predictive control according to the above method can significantly reduce the THD value and the direct current input (direct current input, DCI) value of the grid-tie current, thereby greatly improving the stability and robustness of predictive control.

It is should be noted that, the expanded system model described above is a third-order state model because its corresponding grid-tie inverter includes a second-order LC system, but the present application is not limited thereto, and other expanded state models can be established based on configurations of specific grid-tie inverters. For example, if the grid-tie inverter includes a third-order LCL system, a fourth-order state model is needed to be established based on the output current $i_g$. Similarly, the expanded system model is the disturbance of the system.

Optionally, according to the grid-tie inverter shown in FIG. 2, a second-order LC system model may be established:

$$\begin{cases} L\dfrac{di_l}{dt} = S \times U_{dc} - U_{ac} \\ C\dfrac{dU_{ac}}{dt} = i_l - i_g \end{cases} \quad (5)$$

In the above equation, L represents the inductance in FIG. 2, $i_l$ is the current flowing through all of the inductors (that is, a grid-tie current), S represents ON/OFF states of the respective switches in FIG. 2 ("OFF" is recorded as "1", "ON" is recorded as "0"). In the case of the topological structure shown in FIG. 3, S can be expressed as (S1×S3−S2×S4), $U_{dc}$ is a voltage across the battery in FIG. 3 (that is, a direct current input voltage of the grid-tie inverter), $U_{ac}$ is a voltage across the capacitor in FIG. 3 (that is, an alternating current output voltage of the grid-tie inverter), C represents a capacitance in FIG. 3, $i_g$ is the output current of the grid-tie inverter, and d is a differential function.

Model expansion is performed on the basis of the above Equation (5). Specifically, the grid-tie current $i_1$ is set to be $X_1$, where $X_2$ is a differential of $X_1$, and $X_3$ is a differential of $X_2$. Equation (6) is obtained thereby as follows:

$$\begin{cases} X_1 = i_l \\ X_2 = \dot{X}_1 = \dfrac{di_l}{dt} = \dfrac{S \times U_{dc} - U_{ac}}{L} \\ X_3 = \dot{X}_2 = -\dfrac{i_l}{LC} + \dfrac{i_g}{LC} \end{cases} \quad (6)$$

$X_3$ obtained from the above expansion is the system disturbance.

Since the current flowing through the capacitor in FIG. 2 is much smaller than the output current $i_g$ of the grid-tie inverter, and can even be of a negligible amount, the output current $i_g$ can be directly regarded as the grid-tie current $i_1$. That is, from the output current $i_g$, the third-order state model can be directly obtained as following:

$$\begin{cases} X_1 = i_g \\ X_2 = \dot{X}_1 = \dfrac{di_g}{dt} \\ X_3 = \dot{X}_2 \end{cases} \quad (7)$$

At the same time, a model of the expanded state is obtained after matrix transformation of the above Equation (6), which is as following:

$$X_p \begin{bmatrix} 0 & 1 & 0 \\ a_0 & 0 & 1 \\ 0 & 0 & 0 \end{bmatrix} \begin{pmatrix} x_1 \\ x_2 \\ x_3 \end{pmatrix} + \begin{pmatrix} 0 \\ b_0 \\ 0 \end{pmatrix} u + \begin{pmatrix} 0 \\ 0 \\ 1 \end{pmatrix} f \quad (8)$$
$$y = (1\ 0\ 0)X_p$$
$$p \in (1, 2, 3)$$

where $$a_0 = -\dfrac{1}{LC},\ b_0 = \dfrac{1}{LC},$$

u represents a control quantity of the expanded state model, that is, the grid-tie current $i_1$ flowing through the inductor, and f represents the system disturbance.

The output y of the above expanded state model is the reference current in an ideal situation, that is, the first reference current i_ref1 with no system disturbance being considered. At the same time, as mentioned earlier, since the current flowing through the capacitor in FIG. 2 is much smaller than the output current $i_g$ of the grid-tie inverter, and can even be of a negligible amount, the output current $i_g$ can be directly regarded as the grid-tie current $i_1$. Thus, when p=1, y=$X_1$=i_ref1, an equation of $$u = \dfrac{k_p(i_{ref1} - X_1) - k_d X_2 - X_3}{b_0}$$

can be obtained through calculation, where $k_p = w_c^2$, $k_d = 2w_c$, and $w_c$ is a cut-off frequency of the grid-tie inverter. The calculated u represents the second reference current i_ref2 with the system disturbance being considered.

It should be noted that, the above third-order state model and the functional expression of the second reference current i_ref2 calculated on the basis of the third-order state model are not unique. Based on different grid-tie inverter structures, other forms of third-order state models may be established, and different functional expressions of the second reference current i_ref2 may be calculated accordingly.

It can be seen from FIG. 2 that, when the N output current values $i_g(k+1)$ and the functional expression of the second reference current i_ref2 are acquired, a switch state corresponding to the minimum difference value between $i_g(k+1)$ and i_ref2(k+1) may then be determined from the N switch states corresponding to the N output current values $i_g(k+1)$ at the next moment. That is, the switch state in which $i_g(k+1)$ is closest to i_ref2(k+1) is identified.

For the example grid-tie inverter shown in FIG. 3, as shown in Table 1, there are a total of four switch states. For the four switch states listed in Table 1 (that is, a switch state 1, a switch state 2, a switch state 3, and a switch state 4), the output current values $i_g(k+1)\_1$, $i_g(k+1)\_2$, $i_g(k+1)\_3$, and $i_g(k+1)\_4$ at the next moment are calculated respectively. Then difference values between $i_g(k+1)\_1$ and i_ref2(k+1), between $i_g(k+1)\_2$ and i_ref2(k+1), between $i_g(k+1)\_3$ and i_ref2(k+1), and between $i_g(k+1)\_4$ and i_ref2(k+1) are calculated respectively. Assuming that the difference value between $i_g(k+1)\_2$ and i_ref2(k+1) is determined as the minimum according to the calculation, then the switch state 2 is the switch state to be identified.

Optionally, the switch state to be identified may be obtained by setting a cost function and optimizing the cost function. Specifically, the cost function may be $$G = (i_g(k+1) - i\_ref2(k+1))^2 \quad (9).$$

The above cost function G is optimized so that the value obtained is the smallest. G is optimized so that the switch state corresponding to $i_g(k+1)$ when G takes the minimum value is the switch state to be identified. The difference between the output current value $i_g(k+1)$ at the next moment and the value i_ref2(k+1) of the second reference current at the next moment is amplified, so that the determined switch state can more accurately match the expected output current of the grid-tie inverter. It should be noted that, the above cost function G is merely an example, and various forms of cost functions may be adopted by the control method according to the present application, as long as the i_ref2(k+1) closest to $i_g(k+1)$ can be identified through the cost functions.

For the example grid-tie inverter shown in FIG. 3, according to the previous assumption, the switch state 2 is the switch state to be identified, then the four switches S1 to S4 may be set to "ON", "OFF", "ON", and "OFF" at the next moment according to Table 1, thereby controlling the power transmission of the grid-tie inverter at the next moment.

The control method for the grid-tie inverter according to the present application has been described as above. For conventional model prediction control, disturbance always inevitably occurs in the live network, including errors between given values and actual values of components in the system, and external disturbance such as parameter changes caused by temperature rise. The disturbance causes model parameters in the model prediction control system to be inaccurate, and the condition of model mismatch occurs, thereby resulting in inaccurate control and low output current quality and low power transmission efficiency. However, according to the control method for the grid-tie inverter in the present application, in the prediction of the output current value $i_g(k+1)$ at the next moment, the value $i\_ref2(k+1)$ of the second reference current with compensation at the next moment is used, and the output current value $i_g(k+1)$ at the next moment is thus obtained is more accurate. Through the above-described control method, each of the output current values at the next moment is predicted, and the switches of the grid-tie inverter are set based on the switch state corresponding to the predicted output current values at the next moment. In this manner, various problems caused by disturbance and errors in conventional model predictive control can be overcome, which improves the accuracy of control and the quality the output current of the grid-tie inverter, thereby improving the output stability of the grid-tie inverter.

Figure 11A:
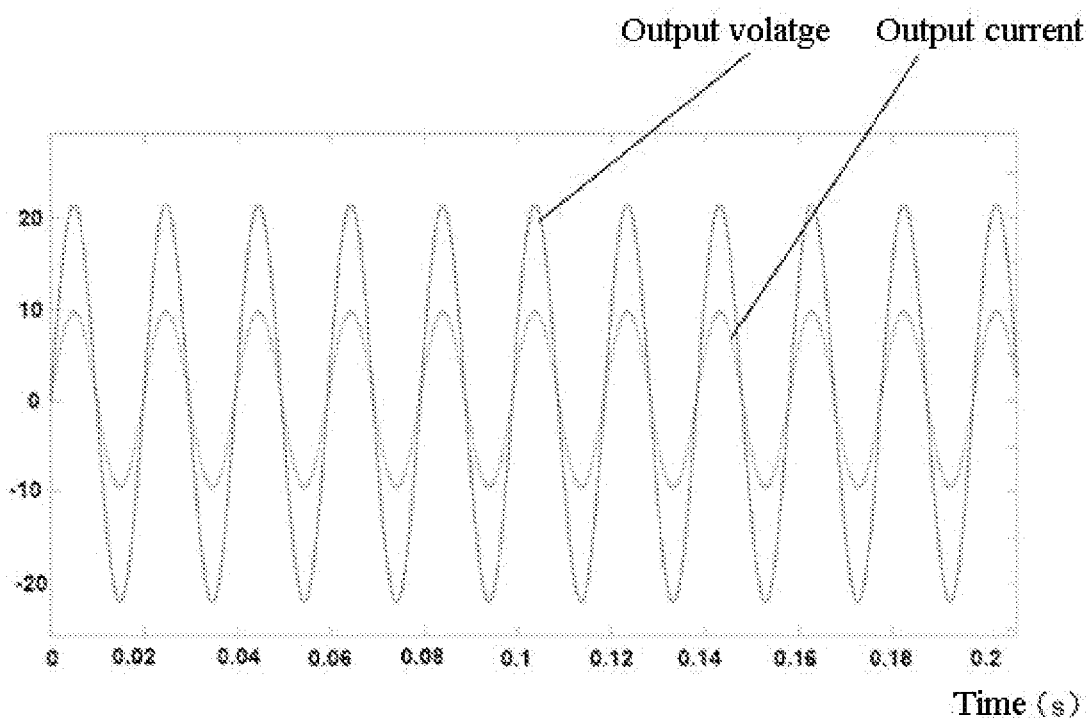
FIG. 11(a) and FIG. 11(b) are comparison schematic diagrams of output signals resulting from model predictive control on a grid-tie inverter using a conventional method and model predictive control on the grid-tie inverter using the control method according to the present application, respectively.
Figure 11B:
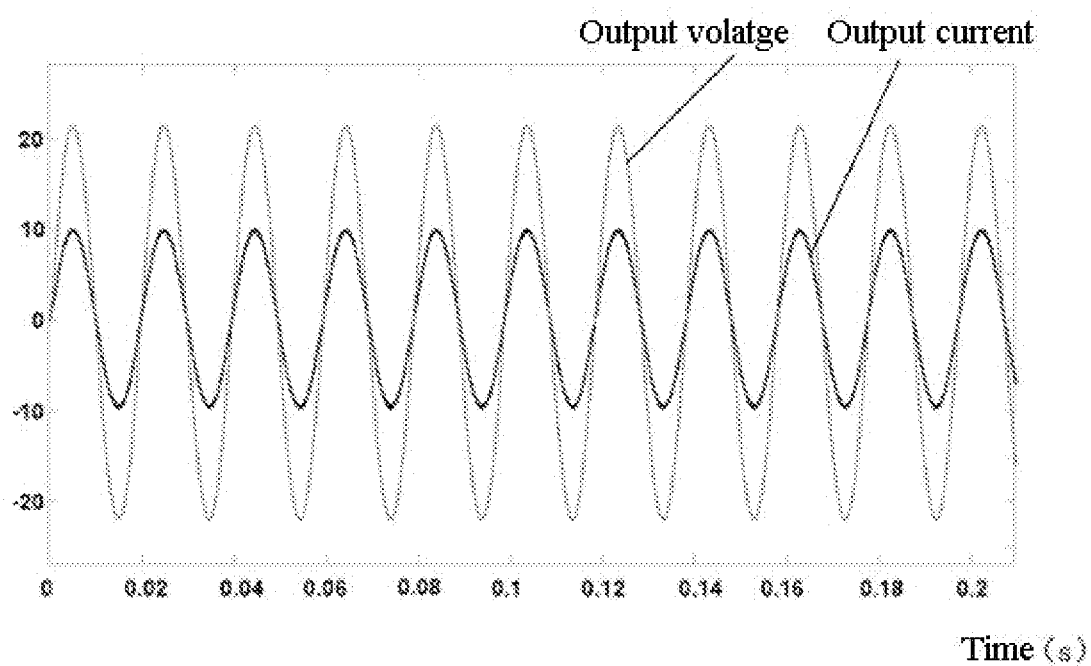

FIG. 11(a) illustrates a waveform simulation diagram of an output current and an output voltage obtained by performing model predictive control on a grid-connected inverter using a conventional method. FIG. 11(b) illustrates a waveform simulation diagram of an output current and an output voltage obtained by performing model predictive control on a grid-connected inverter using the control method according to the present application. It can be clearly seen from these figures that, the resulting output current and output voltage by using the control method according to the present application are more stable.

Figure 12A:
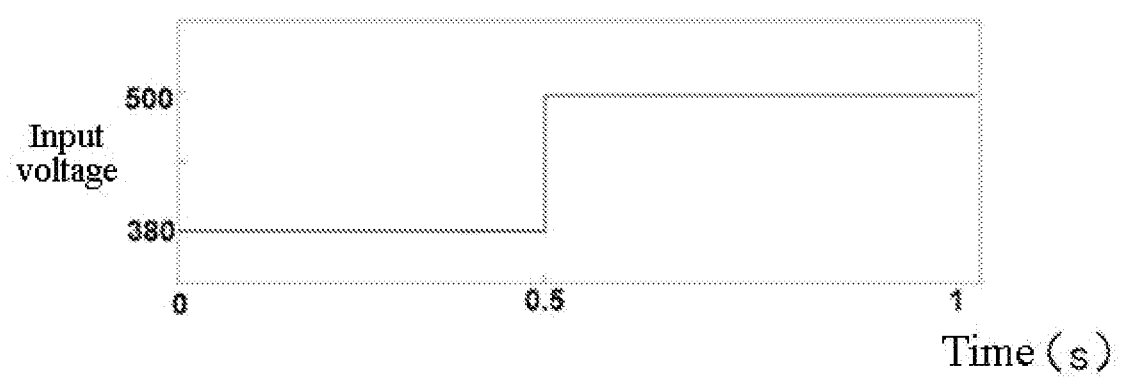
FIG. 12(a) to FIG. 12(e) illustrate comparison schematic diagrams of output currents resulting from model predictive control on a grid-tie inverter using a conventional method and resulted from model predictive control on the grid-tie inverter using the control method according to the present application when voltage jump occurs.
Figure 12B:
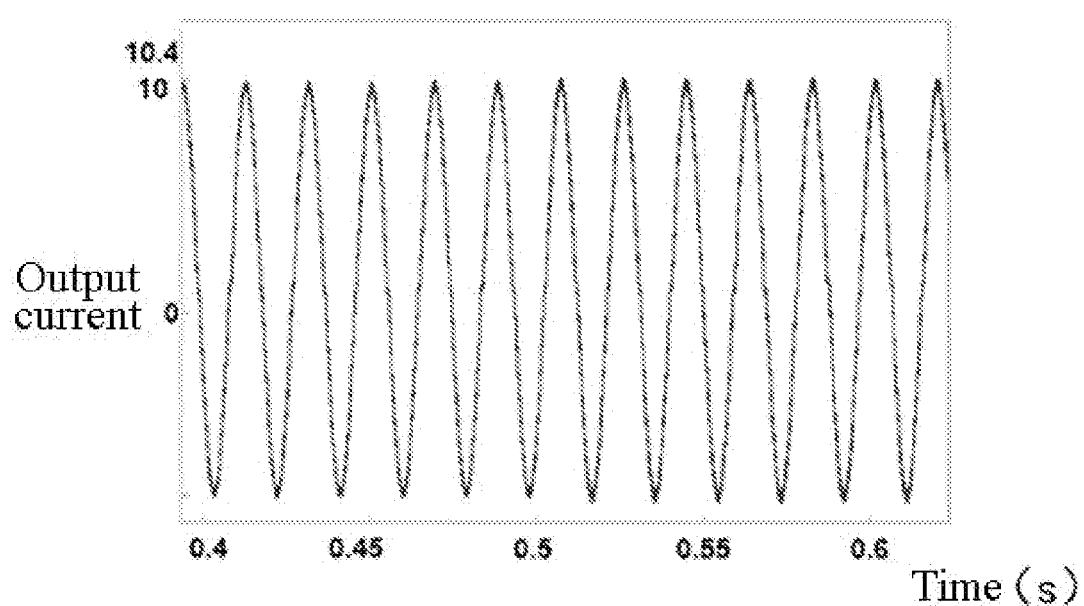
Figure 12C:
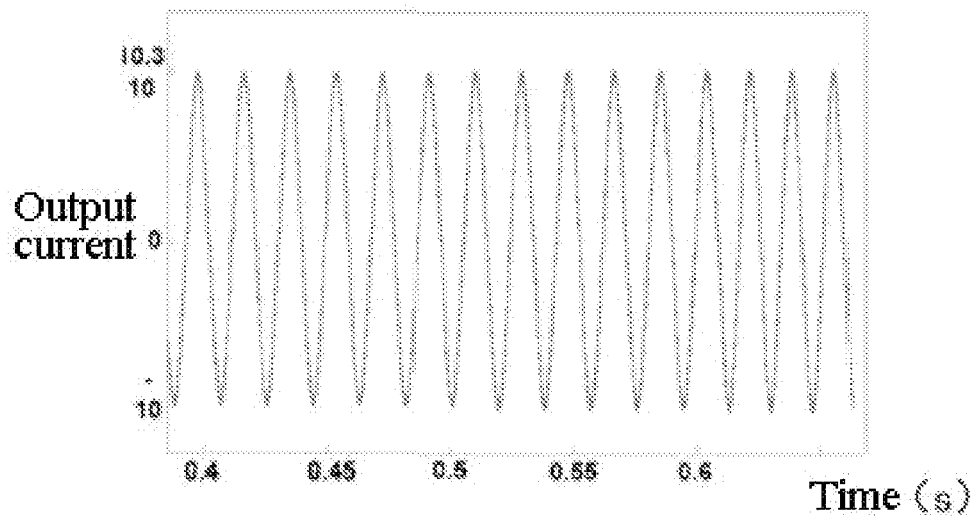
Figure 12D:
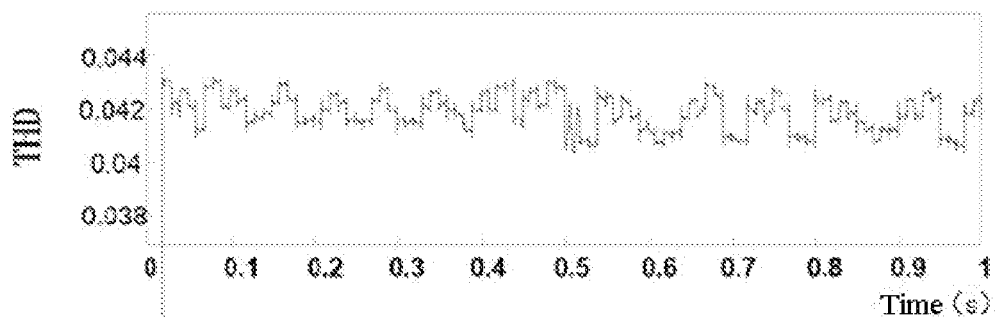
Figure 12E:
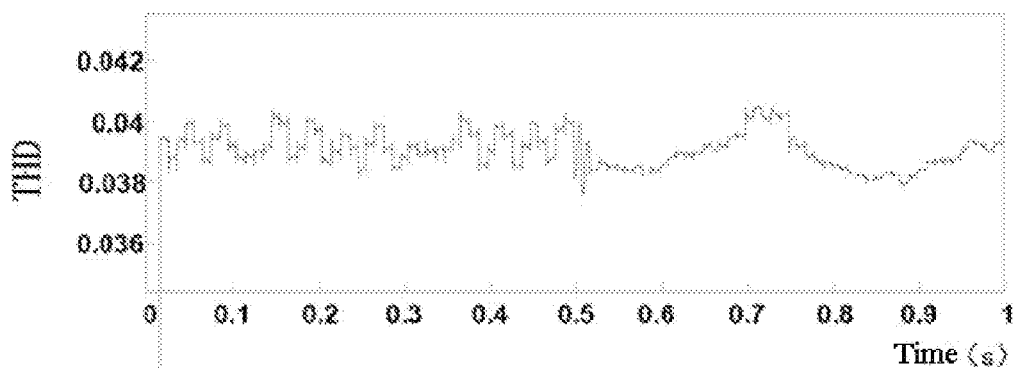

FIG. 12(a) to FIG. 12(d) exemplarily illustrate comparison of output currents resulted from model predictive control on a grid-tie inverter using a conventional method and resulted from model predictive control on the grid-tie inverter using the control method according to the present application when voltage jump occurs. FIG. 12(a) shows that the input voltage on the DC side of the grid-tie inverter jumps from 380V to 500V at the time of 0.5 seconds. In this case, from the waveform simulation diagrams of the output currents shown in FIG. 12(b) (using a conventional method for model predictive control on the grid-tie inverter) and FIG. 12(c) (using the control method according to the present application for model predictive control on the grid-tie inverter), it can be clearly seen that, the resulted output current by the control method according the present application has a small variation range, good stability, and strong robustness. At the same time, it can be clearly seen from the THD values shown in FIG. 12(d) and FIG. 12(e) that the THD of the resulted grid-tie current by the control method according to the present application is significantly reduced.

Figure 13A:
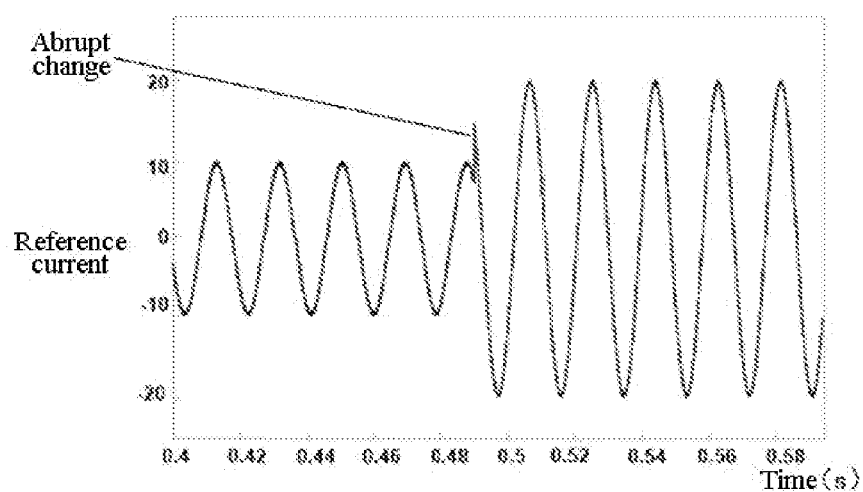
FIG. 13(a) to FIG. 13(d) illustrate comparison diagrams of total harmonic distortion (total harmonic distortion, THD) values of output currents resulting from model predictive control on a grid connected inverter using a conventional method and resulting from model predictive control on the grid connected inverter using the control method according to the present application when the reference current abruptly changes.
Figure 13B:
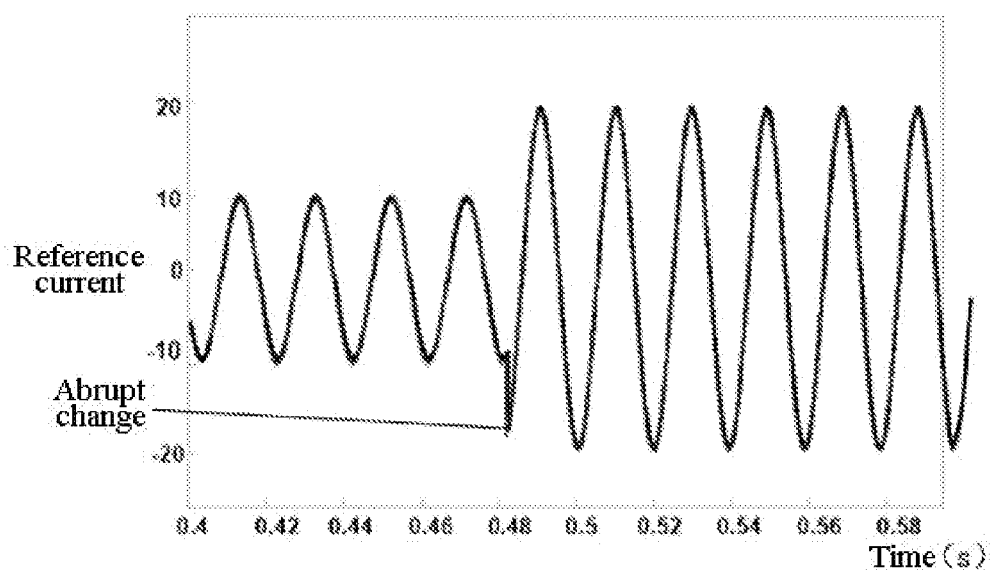
Figure 13C:
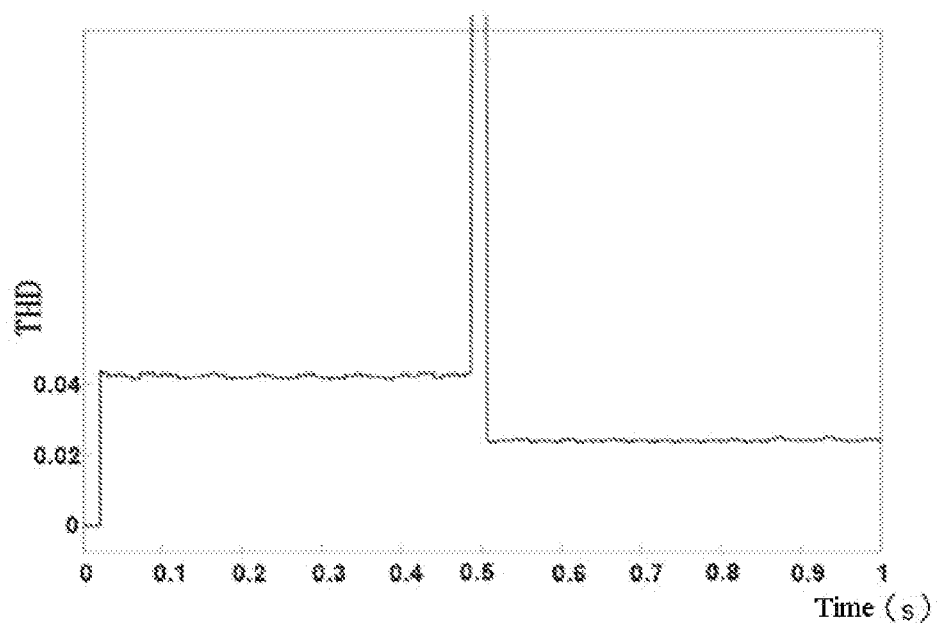
Figure 13D:
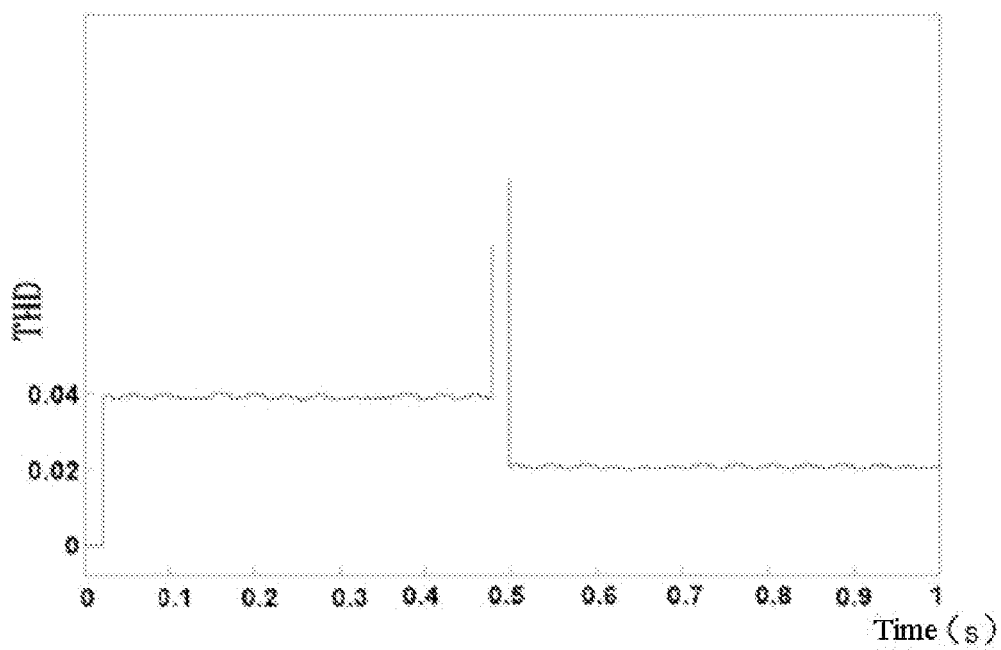

FIG. 13(a) to FIG. 13(d) exemplarily illustrate comparison of THD values of output currents resulted from model predictive control on a grid connected inverter using a conventional method and resulted from model predictive control on the grid connected inverter using the control method according to the present application when the reference current abruptly changes. FIG. 13(a) shows a reference current waveform when a reference current value abruptly changes from 10 A to 20 A at a certain timing in the conventional method. FIG. 13(b) shows a reference current waveform when a reference current value (corresponding to the first reference current in the present application) abruptly changes from 10 A to 20 A at a certain timing in the control method according to the present application. FIG. 13(c) is a corresponding THD waveform in the case of FIG. 13(a). FIG. 13(d) is a corresponding THD waveform in the case of FIG. 13(b). It can be clearly seen that, when the control method according to the present application is used for model predictive control on the grid-connected inverter, since what is actually used for predictive control is the reference current with compensation generated based on the above abrupt change, for an abrupt change of the same degree occurring to the reference current, the THD of the resulted output current by the control method according to the present application is significantly reduced and the quality of the output waveform is better as compared with the conventional method.

In addition, the control method according to the present application may be implemented by a processor executing computer instructions, and the instructions may be stored in a computer-readable storage medium. The computer-readable storage medium may include a hard disk drive, a floppy disk drive, a compact disk read/write (CD-R/W) drive, a digital versatile disk (DVD) drive, a flash drive, and/or a solid-state storage device, etc.

According to the embodiments of the present application, a control apparatus for a grid-tie inverter is also provided correspondingly.

Figure 8:
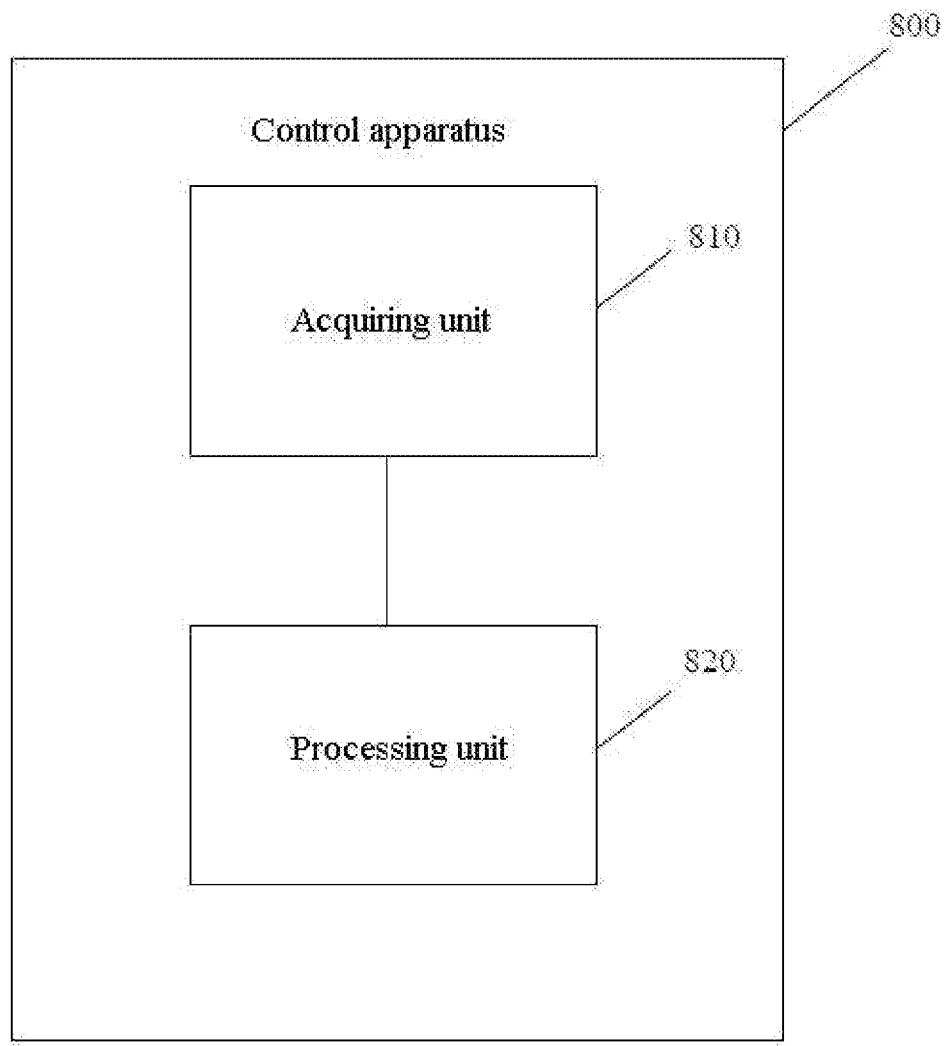
FIG. 8 is a structural block diagram of an control apparatus for a grid-tie inverter according to the present application.

Referring to FIG. 8, a control apparatus 800 for a grid-tie inverter according to the present application is provided, which includes an acquiring unit 810 and a processing unit 820.

The acquiring unit 810 is configured to acquire an output voltage of the grid-tie inverter and an output current value of the grid-tie inverter at the current moment. As described above, the output voltage is the voltage across the capacitor in FIG. 2, which may be obtained by a sensor and represented by the function of $V_g$. The output current is the branch $i_g$ in FIG. 2, that is, the difference value between the grid-tie current flowing through the inductor in FIG. 2 and the current flowing through the capacitor in FIG. 2, which may be obtained by a sensor and represented by the function of $i_g$. The output current value at the current moment is $i_g(k)$, where k represents the current moment.

The processing unit 820 is configured to implement the following functions: calculating N output current values, $i_g(k+1)\_1, i_g(k+1)\_2, \ldots, i_g(k+1)\_N$, of the grid-tie inverter at a next moment based on the output current value $i_g(k)$ at the current moment, where the N output current values at the next moment are in one-to-one correspondence to N switch states of the grid-tie inverter, and N is greater than or equal to 2; acquiring a first reference current i_ref1 based on the output voltage $V_g$, and acquiring a second reference current i_ref2 based on the output current $V_g$ of the grid-tie inverter and the first reference current i_ref1; determining a first switch state from the N switch states, where a difference value between the output current value $i_g(k+1)$ at the next moment corresponding to the first switch state and a value of the second reference current i_ref2(k+1) at the next moment is a minimum value among difference values between the N output current values ($i_g(k+1)\_1, i_g(k+1)\_2, \ldots, i_g(k+1)\_N$) at the next moment and the value of the second reference current i_ref2(k+1) at the next moment; and controlling the grid-tie inverter to perform power transmission in the first switch state at the next moment.

Optionally, the processing unit 820 may be configured to: establish a third-order state model based on an output current $i_g$ of the grid-tie inverter; and acquire the second reference current i_ref2 based on the established third-order state model and the first reference current i_ref1, where the second reference current includes a compensation value for a system disturbance.

Optionally, the third-order state model may be the above Equation (7), and the second reference current i_ref2 may be calculated based on $$i\_ref2 = \frac{k_p(i_{ref1} - X_1) - k_d X_2 - X_3}{b_0},$$

where $k_p=w_c^2$, $k_d=2w_c$, $w_c$ is a cut-off frequency of the grid-tie inverter, $$b_0 = \frac{1}{LC},$$

L is an inductance in the grid-tie inverter, and C is a capacitor in the grid-tie inverter.

Optionally, the processing unit 820 may be configured to: obtain N switch output voltages, U0_1, U0_2, ..., U0_N, respectively, based on the N switch states and an input voltage of the grid-tie inverter; and obtain the N output current values, $i_g(k+1)\_1$, $i_g(k+1)\_2$, ..., $i_g(k+1)\_N$, at the next moment, based on the output current value $i_g(k)$ at the current moment, values, U0(k)_1, U0(k)_2, ..., U0(k)_N, of the N switch output voltages at the current moment, and a value $V_g(k)$ of the output voltage of the grid-tie inverter at the current moment.

Optionally, the N output current values, $i_g(k+1)\_1$, $i_g(k+1)\_2$, $i_g(k+1)\_N$, at the next moment may be calculated according to Equation (10) given above.

Optionally, the processing unit 820 is configured to: obtain a grid phase θ of the grid-tie inverter based on the output voltage $V_g$; and acquire the first reference current i_ref1 based on the grid phase θ.

The above-mentioned control apparatus 800 can implement the control method according to the present application as described above. Many design concepts and details described above applicable to the control method according to the present application are also applicable to the control apparatus 800 described above, and same beneficial technical effects can be obtained, which will not be repeated here.

Figure 9:
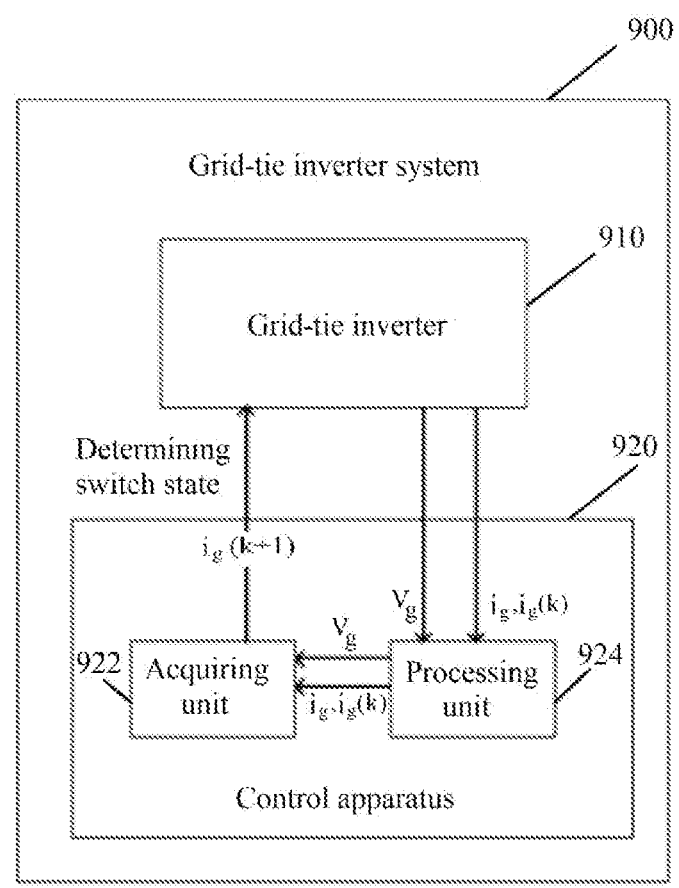
FIG. 9 is a structural block diagram illustrating a grid-tie inverter system according to the present application.

According to the embodiments of the present application, a grid-tie inverter system 900 is also provided, as shown in FIG. 9. The grid-tie inverter system 900 includes a grid-tie inverter 910 and a control apparatus 920. The control apparatus 920 corresponds to the control apparatus 800 described above. The acquiring unit 922 in the control apparatus 920 corresponds to the acquiring unit 810 as described above, and is configured to acquire an output voltage $V_g$ of the grid-tie inverter 910, an output current $i_g$, and the output current value $i_g(k)$ at the current moment. The processing unit 924 (corresponding to the processing unit 820 as described above) in the control apparatus 920 is then configured to determine the ON/OFF state which the grid-tie inverter 910 should be in at the next moment through a series of processing and calculations, and make the grid-tie inverter 910 perform power transmission at the next moment in this switch state. The grid-tie inverter system 900 has excellent robustness and stability, and the THD value and DCI value of the grid-tie current are significantly reduced compared with the prior art.

Figure 10:
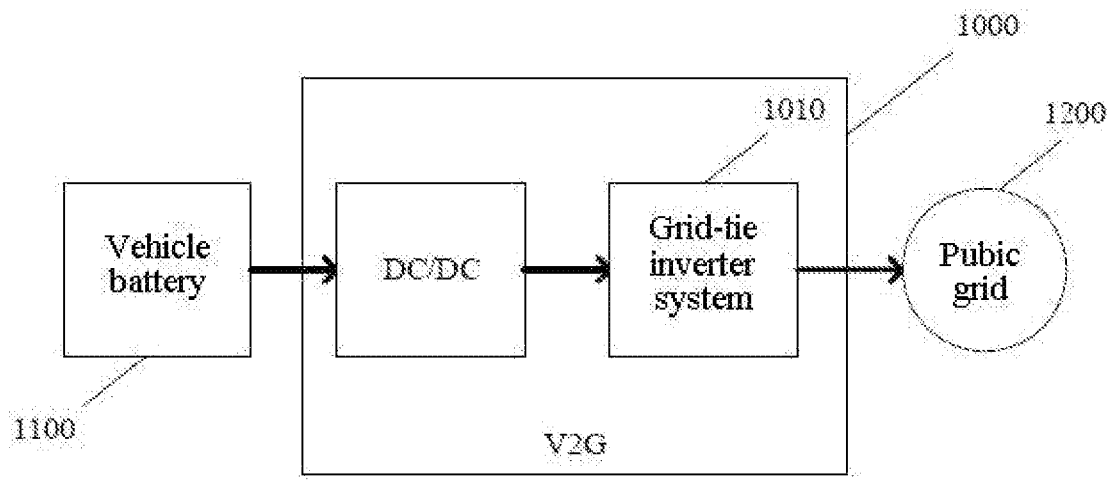
FIG. 10 is a structural block diagram illustrating a V2G system according to the present application.

According to the embodiments of the present application, there is also provided a V2G system 1000, as shown in FIG. 10, where the V2G system 1000 includes a grid-tie inverter system 1010 corresponding to the above-described grid-tie inverter system 900. Therefore, the power transmission from the car battery 1100 to the public grid 1200 can be realized more stably and accurately.

The present application has been described above through some exemplary embodiments. However, it should be understood that various modifications can be made to the above-mentioned exemplary embodiments without departing from the spirit and scope of the present application. For example, if the described techniques are performed in a different order and/or if components in the described system, architecture, device, or circuit are combined in a different manner and/or replaced or supplemented by additional components or their equivalents, then these other embodiments as modified also fall within the scope of the claims accordingly.

What is claimed is:

1. A method for controlling a grid-tie inverter comprising:
   acquiring an output voltage of the grid-tie inverter and an output current value of the grid-tie inverter at a current moment;
   calculating N output current values of the grid-tie inverter at a next moment based on the output current value at the current moment, wherein the N output current values at the next moment are in one-to-one correspondence to N switch states of the grid-tie inverter, and N is a natural number greater than or equal to 2;
   obtaining a grid phase of the grid-tie inverter based on the output voltage, and acquiring a first reference current based on the grid phase;
   establishing a third-order state model based on an output current of the grid-tie inverter;
   acquiring a second reference current based on the third-order state model and the first reference current, wherein the second reference current comprises a compensation value for a system disturbance;
   determining a first switch state from the N switch states, wherein a difference value between the output current value at the next moment corresponding to the first switch state and a value of the second reference current at the next moment is a minimum value among difference values between the N output current values at the next moment and the value of the second reference current at the next moment; and
   controlling at least one switching element of the grid-tie inverter to perform power transmission in the first switch state at the next moment,
   wherein the third-order state model is $$\begin{cases} X_1 = i_g \\ X_2 = \dot{X}_1 = \frac{di_g}{dt} \\ X_3 = \dot{X}_2 \end{cases}$$

where $X_1$ represents the output current $i_g$ of the grid-tie inverter, $X_2$ is a differential of $X_1$, and $X_3$ is a differential of $X_2$ and represents the system disturbance,
the second reference current is obtained by the following equation:

$$u = \frac{k_p(i_{ref1} - X_1) - k_d X_2 - X_3}{b_0}$$

where u represents the second reference current, $i_{ref1}$ is the first reference current, $k_p=w_c^2$, $k_d=2w_c$, $w_c$ is a cut-off frequency of the grid-tie inverter, $$b_0 = \frac{1}{LC},$$

L is an inductance of the grid-tie inverter, and C is a capacitance in the grid-tie inverter.

2. The method according to claim 1, wherein the calculating N output current values of the grid-tie inverter at a next moment based on the output current value at the current moment comprises:
   obtaining N switch output voltages respectively, based on the N switch states and an input voltage of the grid-tie inverter; and
   obtaining the N output current values at the next moment, based on the output current value at the current moment, values of the N switch output voltages at the current moment and a value of the output voltage of the grid-tie inverter at the current moment.

3. The method according to claim 2, wherein the N output current values $i_g$ (K+1) at the next moment are calculated by the following equation:

$$i_g(k+1) = \left(1 - \frac{T_s}{L}r\right) \times i_g(k) + \frac{T_s}{L}(U_0(k) - V_g(k))$$

where k represents the current moment, $T_s$ is a control frequency of the grid-tie inverter, r is an internal resistance of the grid-tie inverter, L is an inductance of the grid-tie inverter, $i_g(k)$ are the N output current values at the current moment, $U_0(k)$ are the values of the N switch output voltages at the current moment, and $V_g(k)$ are the value of the output voltage of the grid-tie inverter at the current moment.

4. An apparatus for controlling a grid-tie inverter, comprising a processor and a memory storing program codes, wherein the program codes, when executed by the processor, cause the processor to:
   acquire an output voltage of the grid-tie inverter and an output current value of the grid-tie inverter at a current moment;
   calculate N output current values of the grid-tie inverter at a next moment based on the output current value at the current moment, wherein the N output current values at the next moment are in one-to-one correspondence to N switch states of the grid-tie inverter, and N is a natural number greater than or equal to 2;
   obtain a grid phase of the grid-tie inverter based on the output voltage, and acquiring a first reference current based on the grid phase;
   establish a third-order state model based on an output current of the grid-tie inverter;
   acquire a second reference current based on the third-order state model and the first reference current, wherein the second reference current comprises a compensation value for a system disturbance;
   determine a first switch state from the N switch states, wherein a difference value between the output current value at the next moment corresponding to the first switch state and a value of the second reference current at the next moment is a minimum value among difference values between the N output current values at the next moment and the value of the second reference current at the next moment; and
   control at least one switching element of the grid-tie inverter to perform power transmission in the first switch state at the next moment,
   wherein the third-order state model is $$\begin{cases} X_1 = i_g \\ X_2 = \dot{X}_1 = \frac{di_g}{dt} \\ X_3 = \dot{X}_2 \end{cases}$$

where $X_1$ represents the output current $i_g$ of the grid-tie inverter, $X_2$ is a differential of $X_1$, and $X_3$ is a differential of $X_2$ and represents the system disturbance,
the second reference current is obtained by the following equation:

$$u = \frac{k_p(i_{ref1} - X_1) - k_d X_2 - X_3}{b_0}$$

wherein u represents the second reference current, $i_{ref1}$ is the first reference current, $k_p = w_c^2$, $k_d = 2w_c$, $w_c$ is a cut-off frequency of the grid-tie inverter, $$b_0 = \frac{1}{LC},$$

L is an inductance of the grid-tie inverter, and C is a capacitance of the grid-tie inverter.

5. The apparatus according to claim 4, wherein the program codes further cause the processor to
   obtain N switch output voltages respectively, based on the N switch states and an input voltage of the grid-tie inverter; and
   obtain the N output current values at the next moment, based on the output current value at the current moment, values of the N switch output voltages at the current moment and a value of the output voltage of the grid-tie inverter at the current moment.

6. The apparatus according to claim 5, wherein the N output current values $i_g$ (K+1) at the next moment are calculated by the following equation:

$$i_g(k+1) = \left(1 - \frac{T_s}{L}r\right) \times i_g(k) + \frac{T_s}{L}(U_0(k) - V_g(k))$$

where k represents the current moment, $T_s$ is a control frequency of the grid-tie inverter, r is an internal resistance of the grid-tie inverter, L is an inductance of the grid-tie inverter, $i_g(k)$ are the N output current values at the current moment, $U_0(k)$ are the values of the N switch output voltages at the current moment, and $V_g(k)$ are the value of the output voltage of the grid-tie inverter at the current moment.

7. A non-transitory computer-readable storage medium having instructions stored thereon, wherein the instructions, when executed by a processor, cause the processor to:
   acquire an output voltage of the grid-tie inverter and an output current value of the grid-tie inverter at a current moment;
   calculate N output current values of the grid-tie inverter at a next moment based on the output current value at the current moment, wherein the N output current values at the next moment are in one-to-one correspondence to N switch states of the grid-tie inverter, and N is a natural number greater than or equal to 2;
   obtain a grid phase of the grid-tie inverter based on the output voltage, and acquire a first reference current based on the grid phase;
   establish a third-order state model based on an output current of the grid-tie inverter;
   acquire a second reference current based on the third-order state model and the first reference current, wherein the second reference current comprises a compensation value for a system disturbance;

determine a first switch state from the N switch states, wherein a difference value between the output current value at the next moment corresponding to the first switch state and a value of the second reference current at the next moment is a minimum value among difference values between the N output current values at the next moment and the value of the second reference current at the next moment; and control at least one switching element of the grid-tie inverter to perform power transmission in the first switch state at the next moment, wherein the third-order state model is $$\begin{cases} X_1 = i_g \\ X_2 = \dot{X}_1 = \dfrac{di_g}{dt} \\ X_3 = \dot{X}_2 \end{cases}$$

where $X_1$ represents the output current $i_g$ of the grid-tie inverter, $X_2$ is a differential of $X_1$, and $X_3$ is a differential of $X_2$ and represents the system disturbance, the second reference current is obtained by the following equation:

$$u = \frac{k_p(i_{ref1} - X_1) - k_d X_2 - X_3}{b_0}$$

where u represents the second reference current, $i_{ref1}$ is the first reference current, $k_p = w_c^2$, $k_d = 2w_c$, $w_c$ is a cut-off frequency of the grid-tie inverter, $$b_0 = \frac{1}{LC},$$

L is an inductance of the grid-tie inverter, and C is a capacitance in the grid-tie inverter.

8. The non-transitory computer-readable storage medium according to claim 7, wherein the instructions further cause the processor to:

obtain N switch output voltages respectively, based on the N switch states and an input voltage of the grid-tie inverter; and obtain the N output current values at the next moment, based on the output current value at the current moment, values of the N switch output voltages at the current moment and a value of the output voltage of the grid-tie inverter at the current moment.

9. The non-transitory computer-readable storage medium according to claim 8, wherein the N output current values $i_g$(K+1) at the next moment are calculated by the following equation:

$$i_g(k+1) = \left(1 - \frac{T_s}{L}r\right) \times i_g(k) + \frac{T_s}{L}(U_0(k) - V_g(k))$$

where k represents the current moment, $T_s$ is a control frequency of the grid-tie inverter, r is an internal resistance of the grid-tie inverter, L is an inductance of the grid-tie inverter, $i_g$(k) are the N output current values at the current moment, $U_0$(k) are the values of the N switch output voltages at the current moment, and $V_g$(k) are the value of the output voltage of the grid-tie inverter at the current moment.

* * * * *